Jan. 11, 1938. W. A. RIDDELL 2,105,228
SHUTTER TRIGGER LATCH
Filed Oct. 30, 1936
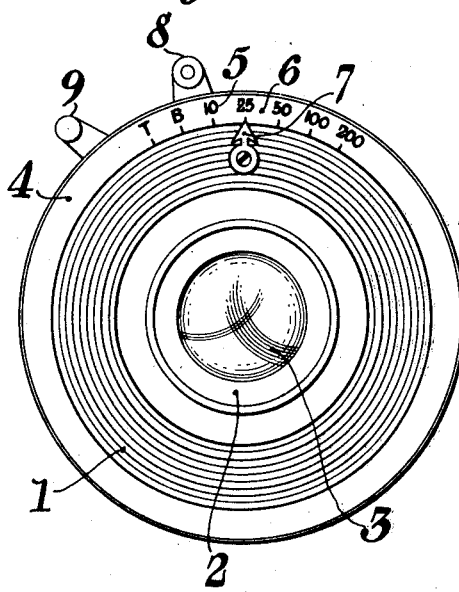
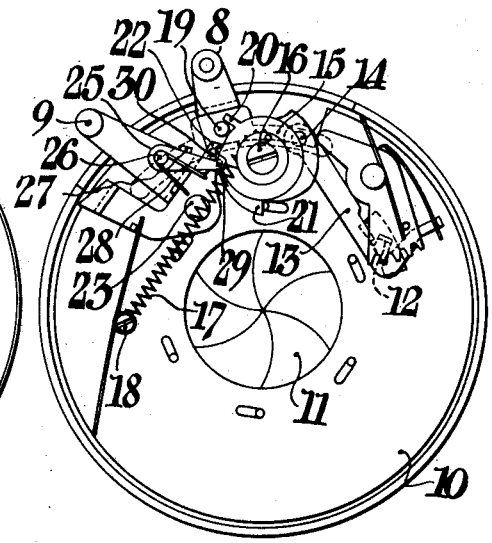
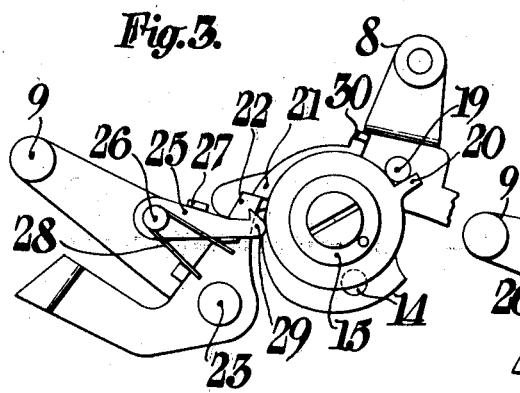
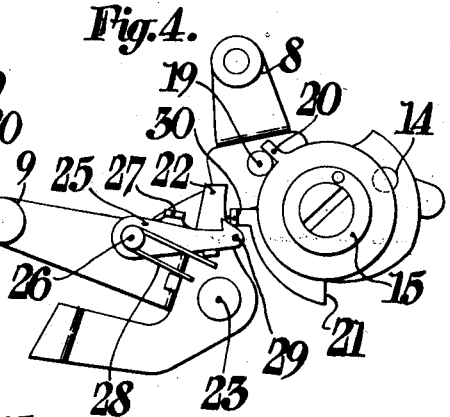
William A. Riddell,
INVENTOR.
BY
ATTORNEYS.

Patented Jan. 11, 1938

2,105,228

UNITED STATES PATENT OFFICE 2,105,228

SHUTTER TRIGGER LATCH

William A. Riddell, Rochester, N. Y., assignor to Eastman Kodak Company, Rochester, N. Y., a corporation of New Jersey Application October 30, 1936, Serial No. 108,392

9 Claims. (Cl. 95—63)

This invention relates to photography and more particularly to shutters for photographic cameras.

One object of my invention is to provide a shutter in which movement of the trigger is prevented until the master member has been placed under tension. Another object of my invention is to provide a shutter in which the tensioning of the master member automatically releases the shutter trigger for operation. Another object of my invention is to provide a shutter in which the trigger will be automatically latched against a second operation unless the shutter has been previously set, and other objects will appear from the following specification, the novel features being particularly pointed out in the claims at the end thereof.

Coming now to the drawing wherein like reference characters denote like parts throughout:

Fig. 1 is a front plan view of a typical shutter constructed in accordance with and embodying a preferred form of my invention.

Fig. 2 is a plan view of the shutter shown in Fig. 1, but with the shutter cover removed.

Fig. 3 is a fragmentary detail view showing the relative position of the shutter parts when the trigger is released for exposure, and when the master member of the shutter has been placed under tension.

Fig. 4 is a view similar to Fig. 3, but with the master member released and the trigger depressed for making an exposure.

Fig. 5 is a fragmentary detail showing in elevation and part in section the interengaging parts on the trigger and master member.

It has been found that with shutters of the setting type it sometimes occurs that an inexperienced operator will depress the trigger and will imagine that an exposure has been made, whereas, as a matter of fact, the master member had not been previously tensioned, so that the shutter leaves are not opened and closed. If a fresh area of film should be wound into place, an exposure area is wasted.

With certain cameras now on the market, connections are made between the shutter trigger and camera body so that the trigger is operated from the camera body. In such cameras the difficulty above mentioned is somewhat increased, and this is particularly so where double exposure prevention devices are built into the camera body.

In order to prevent the operation of the trigger until the shutter is properly conditioned for an exposure, I have provided a means for blocking the operation of the trigger when the parts are in a predetermined position.

As a preferred embodiment of my invention I have shown a shutter of the type shown in my copending application Serial No. 75,155, filed April 18, 1936 for photographic shutter. As illustrated in Fig. 1 the shutter may consist of a casing having a shutter cover or front plate 1, supporting a lens cell 2, in which the front lens element 3 may be mounted. Around the outside of the cover 1 there is an annular member 4 which may be moved to bring various graduations 5 on a scale designated broadly as 6 opposite to a pointer 7 to indicate the speed of exposure or the type of exposure which will be made at the indicated setting.

The shutter may be provided with a setting lever 8 which is used to tension the master member, and with a trigger 9 which may be depressed in the usual manner to release the master member to make an exposure.

Referring to Fig. 2 the shutter may be provided with a shutter plate 10 behind which are mounted the usual shutter leaves 11 which open and close to make an exposure. This movement may occur when the upstanding post 12, which forms a part of the shutter operating mechanism, is moved rapidly back and forth by means of a crank 13 pivotally attached at 14 to a master member 15, which is pivotally mounted upon the stud 16.

The master member is normally drawn toward the position illustrated in Fig. 2 by means of a spring 17 attached to a stud 18 extending into the shutter plate 10. However, the master member can be moved to its operative position in which it may operate the shutter blades, by swinging the setting lever 8 in a clockwise direction with respect to Fig. 2, so that the pin 19, through its engagement with the lug 20, will swing the master member 15 upon its pivot 16 into an operative or set position in which the lug 21 is engaged by the end 22 of the trigger member 9, as is, for instance, best shown in Fig. 3.

When in this position, in order to make an exposure the trigger is moved in a counterclockwise direction about its pivot 23 to the position indicated in Fig. 4, during which movement the members 21 and 22 slide away from each other, permitting the spring 17 to rapidly turn the master member 15, causing the link 13, by a rapid back and forth movement, to oscillate the upstanding lug 12 which operates the shutter leaves 11.

As thus far described, the shutter mechanism is of the type shown in my copending application mentioned above, and this structure forms no part of the present invention.

In accordance with the present invention, it is desirable to prevent the operation of the trigger 9 unless the shutter master member 15 has been first placed under tension.

Referring to Fig. 2, it will be seen that the trigger 9 supports a latch member 25 on a stud 26, this latch member being normally held against the stop 27 by means of a hair-pin spring 28. The latch 25 includes a hook-shaped member 29 which is adapted to engage an upstanding lug 30, carried by the master member 15 when the latter is moved to its normal position of rest, from which position the master member cannot operate the shutter leaves 11. This position is shown in Fig. 2, wherein the latch member 25 is shown with the hook 29 in engagement with the upstanding lug 30.

If an operator should endeavor to depress the trigger in this position, the latch would prevent its operation and the trigger could not be moved upon its pivotal mounting 23. Since an operator could not depress the trigger, his attention would immediately be called to the fact that the shutter was not set, and accordingly he would swing the lever 8 from the position shown in Fig. 2 to the position shown in Fig. 3, in which the pin 19 engages the lug 20 and places the spring 17 under tension, the master member being held in this position by the interengaging parts 21 and 22.

The first part of the movement of lever 8 turns the master member 15 upon its stud 16, and accordingly moves the upstanding lug 30 away from the end of the hook member 29. Thus, the shutter trigger is immediately unlatched during the start of the setting movement.

It should be noticed, however, that unless the setting movement is completed, and unless the interengaging members 21 and 22 are brought into contact to hold the master member in its operative or set position, the shutter trigger will again be latched, because, if pressure upon the lever 8 is released, the master member will immediately swing backwardly again under the influence of spring 17 until the upstanding lug 30 again engages the hook-shaped member 29.

However, if the movement of the lever 8 is completed to set the shutter, the trigger will remain unlatched and can be depressed as indicated in Fig. 4, to release the interengaging members 21 and 22, permitting the master member 15 to rapidly swing from the position shown in Fig. 3 to the position shown in Fig. 4 to oscillate the crank 13 and to make an exposure.

It will thus be seen that with a shutter constructed in accordance with my invention, the trigger can only be operated when the shutter is set, and that at all other times when the trigger is released and when the master member is in its normal position of rest, the trigger will be definitely latched and held against movement.

The above embodiment of my invention is a preferred one, but it is quite obvious that many changes can be made without departing from my invention, since it is only necessary to provide some means which will keep the operator from actuating the trigger 9 unless the master member has first been placed under tension. It is also obvious that my invention may be applied to any shutter of the type in which the master member must be placed under tension before an exposure can be made—that is, a shutter of the type known as a setting shutter.

What I claim is:

1. In a shutter for photographic cameras, the combination with a shutter casing, of mechanism therefor including a power spring, a movable setting lever extending through the casing and mounted to move through a fixed path for placing the spring under tension when moved to one end of its path, a shutter trigger extending through the shutter casing, a movable mount for the shutter trigger upon which it may move in a fixed path to and from a position in which it may operate the shutter mechanism, a movable latching member adapted to cooperate with the shutter setting member at one end of its path of movement for holding the trigger in an inoperative position at one end of its path of movement, said setting member being adapted to release said trigger when said setting member is moved through its fixed path to place the power spring under tension whereby the shutter trigger may be operated to actuate the shutter mechanism.

2. In a shutter for photographic cameras, the combination with a shutter casing, of shutter mechanism mounted therein including a power spring, a shutter setting member movably mounted in the shutter casing and extending therethrough, a mount for the shutter setting member on which it may move through a fixed path to place the shutter spring under tension, a shutter trigger movably mounted in the shutter casing and extending therethrough, a mount for the trigger on which it may move through a fixed path, means contained in the shutter casing for holding the trigger against movement at one end of its path, said means comprising a movably mounted latch element inside of the shutter casing adapted to engage the shutter setting member at one end of its path of movement, the path of movement of the shutter setting member being such that said latching element may be released by moving the shutter setting member toward one end of its path to tension the shutter spring, whereby said trigger may be actuated only when said shutter spring is under tension.

3. In a shutter for photographic cameras, the combination with a shutter casing, of shutter mechanism therein including a power spring, a moveable setting member for placing the spring under tension, a trigger adapted to be manually actuated for releasing the shutter mechanism and means for latching the trigger against movement, and cooperating parts on said means and shutter setting member adapted to release the latching means when the shutter setting member is moved to one position.

4. In a shutter for photographic cameras, the combination with a shutter casing, of shutter mechanism therein including a spring, a setting lever to tension the spring moveable to and from an operative position in which the shutter is set, a trigger adapted to move through a fixed path for releasing the shutter mechanism, pivotal mounts for the shutter setting lever and trigger, a pivotal latch including two elements one on the trigger and the other on the shutter setting member adapted to hold the trigger against movement, a spring urging the elements into latching engagement and means included in the shutter setting lever for engaging a latch element and releasing the trigger as said shutter setting lever is moved.

5. In a shutter for photographic cameras, the combination with a shutter casing, of shutter mechanism therein including a spring attached at one end to the casing, a setting lever attached to the other end of said spring to tension the spring, said setting lever being movable to and from an operative position in which the shutter is set, a trigger adapted to move through a fixed path for releasing the shutter mechanism, a spring for pressing the trigger toward a normal position of rest, pivotal mounts spaced apart for the shutter setting lever and trigger, a latch including two elements, at least one of which is pivotally mounted, one of said elements being carried by the trigger and the other of said elements being carried by the shutter setting member, said latch elements being adapted to hold the trigger against movement when engaged, said elements being adapted to be disengaged when said trigger is at its normal position of rest and when said shutter setting member is in its operative position.

6. In a shutter for photographic cameras, the combination with a shutter casing, of a trigger pivotally attached thereto and moveable to and from a normal position of rest, a spring, a shutter setting member moveably mounted on said casing and moveable to and from an inoperative position in which the spring is inoperative, a latch of two parts comprising a pin and spring hook, one part carried by the trigger, the other part carried by the shutter setting member, said latch holding the trigger to the setting member when the trigger is in its normal position of rest and when said shutter setting member is in an inoperative position.

7. In a shutter for photographic cameras, the combination with a shutter casing, of a trigger pivotally attached thereto and moveable to and from a normal position of rest, a spring, a shutter setting member moveably mounted on said casing and moveable to and from an inoperative position in which the spring is inoperative, a latch of two parts comprising a pin and spring hook, one part carried by the trigger, the other part carried by the shutter setting member, said latch holding the trigger to the setting member when the trigger is in its normal position of rest and when said shutter setting member is in an inoperative position, the movement of the shutter setting member to tension the spring being adapted to move one latch element from the other thereby releasing the trigger.

8. In a shutter for photographic cameras, the combination with a shutter casing, of a trigger pivotally attached thereto and moveable to and from a normal position of rest, a spring, a shutter setting member pivotally mounted in the shutter casing, a lug projecting therefrom, a spring latch carried by the trigger, a spring for normally pressing the latch toward the lug and into locking engagement therewith, means for releasing the latch by moving the lug about its pivot in setting the spring thereby releasing the trigger.

9. In a shutter for photographic cameras, the combination with a shutter casing, of a trigger pivotally attached thereto and moveable to and from a normal position of rest, a spring attached to the shutter casing at one end, a shutter setting member pivotally mounted in the shutter casing and attached to the other end of said spring, a lug projecting therefrom, a spring latch carried by the trigger, a spring for normally pressing the latch toward the lug and into locking engagement therewith, a lug on the trigger for limiting the movement of the latch thereon, the relative positions of the trigger pivot and shutter setting member pivot being such that as the trigger swings toward its normal position of rest, the trigger latch may move radially of the lug on the shutter setting member whereby the latch elements may be automatically engaged when said shutter setting member is in an inoperative position.

WILLIAM A. RIDDELL.

DISCLAIMER 2,105,228.—*William A. Riddell*, Rochester, N. Y. SHUTTER TRIGGER LATCH. Patent dated January 11, 1938. Disclaimer filed May 6, 1939, by the assignee, *Eastman Kodak Company*.

Hereby enters this disclaimer as to claims 1, 2, and 3 of said patent.

[*Official Gazette May 30, 1939.*]